(12) United States Patent
Di Censo et al.

(10) Patent No.: US 10,136,234 B2
(45) Date of Patent: Nov. 20, 2018

(54) TECHNIQUES FOR AUTONOMOUSLY CALIBRATING AN AUDIO SYSTEM

(71) Applicant: HARMAN INTERNATIONAL INDUSTRIES, INC., Stamford, CT (US)

(72) Inventors: Davide Di Censo, Oakland, CA (US); Stefan Marti, Oakland, CA (US); Jaime Elliot Nahman, Oakland, CA (US)

(73) Assignee: HARMAN INTERNATIONAL INDUSTRIES, INCORPORATED, Stamford, CT (US)

(*) Notice: Subject to any disclaimer, the term of this patent is extended or adjusted under 35 U.S.C. 154(b) by 25 days.

(21) Appl. No.: 14/712,835

(22) Filed: May 14, 2015

(65) Prior Publication Data

US 2016/0337771 A1 Nov. 17, 2016

(51) Int. Cl.
*H04R 29/00* (2006.01)
*B64C 39/02* (2006.01)
*H04S 7/00* (2006.01)

(52) U.S. Cl.
CPC .......... *H04R 29/00* (2013.01); *B64C 39/024* (2013.01); *H04S 7/301* (2013.01);
(Continued)

(58) Field of Classification Search
CPC . H04R 5/00; H04R 5/02; H04R 5/023; H04R 5/005; H04R 5/033; H04R 29/00–29/008; H04R 27/00; H04R 3/005; H04R 3/02; H04R 3/12; H04R 2227/003; H04R 2420/03; H04R 2420/05;
(Continued)

(56) References Cited

U.S. PATENT DOCUMENTS

| 5,185,801 A | * | 2/1993 | Meyer | H04R 3/04 381/59 |
| 2002/0060267 A1 | * | 5/2002 | Yavnai | G05D 1/0038 244/23 A |

(Continued)

FOREIGN PATENT DOCUMENTS

| WO | 2013150374 A1 | 10/2013 |
| WO | 2014032709 A1 | 3/2014 |
| WO | 2016029469 A1 | 3/2016 |

OTHER PUBLICATIONS

Sojeong Yoon, etc., "Advanced Sound Capturing Method with Adaptive Noise Reduction System for Broadcasting Multicopters", IEEE International Conf. on Consumer Electronics ICCE, Jan. 9-12, 2015, p. 26-29.*

(Continued)

*Primary Examiner* — Leshui Zhang
(74) *Attorney, Agent, or Firm* — Artegis Law Group, LLP

(57) ABSTRACT

One embodiment of the present invention sets forth a technique for calibrating an audio system. The technique includes transmitting information to a robotic vehicle for positioning a microphone at a plurality of different listening locations within a listening environment and, for each different listening location, acquiring a sound measurement via the microphone. The technique further includes calibrating at least one audio characteristic of the audio system based on the sound measurements acquired at the different listening locations.

19 Claims, 11 Drawing Sheets

(52) U.S. Cl.
CPC .... *B64C 2201/027* (2013.01); *B64C 2201/12* (2013.01); *H04R 29/007* (2013.01)

(58) Field of Classification Search
CPC ........ H04R 1/02; H04R 3/00; H04R 2430/01; H04R 2203/00; H04R 3/002; H04R 3/007; H04R 3/04; H04R 3/06; H04R 3/08; H04R 3/10; H04R 3/14; H04S 1/002; H04S 1/005; H04S 7/00; H04S 7/30; H03G 3/32; H03G 3/00; H03G 3/20; H03G 3/3005; H03G 3/3089; H03G 3/005; G10H 1/16
USPC ...... 381/56, 57, 58, 59, 61, 91, 92, 26, 333, 381/334, 111–115, 122, 86, 302, 361, 381/365, 366; 700/94; 324/330; 348/86, 348/118; 341/20; 244/17.17, 3.1, 17.11, 244/17.19, 17.21, 17.23, 75.1, 175, 23 R, 244/23 A, 23 B
See application file for complete search history.

(56) References Cited

U.S. PATENT DOCUMENTS

| | | | |
|---|---|---|---|
| 2005/0271221 A1* | 12/2005 | Cerwin | H04R 1/406 381/92 |
| 2007/0200027 A1* | 8/2007 | Johnson | B64C 39/022 244/3.1 |
| 2008/0212819 A1 | 9/2008 | Cerwin et al. | |
| 2010/0201807 A1* | 8/2010 | McPherson | F16M 11/10 348/118 |
| 2013/0050652 A1* | 2/2013 | Wharton | H04N 5/2251 352/34 |
| 2013/0166103 A1 | 6/2013 | Ko | |
| 2014/0211086 A1* | 7/2014 | Wharton | H04N 7/185 348/484 |
| 2016/0375997 A1* | 12/2016 | Welsh | B64C 39/024 244/17.23 |

OTHER PUBLICATIONS

Extended European Search Report having Application No. 16 16 7374, dated Aug. 5, 2016, 7 pages.
Hovding Airbag for urban (11 pages) cyclists http://quadcopterhq.com/what-is-a-gimbal/.
Warwick Mills "Protective Fabric Warwick's Material Used in Mars Landings" http://www.warwickmills.com/Protective-Fabrics-Mars.aspx.
QuadcoperHQ.com, Admin "What is a Gimbal" Dec. 2, 2013 (5 pages). http://www.warwickmills.com/Protective-Fabrics-Mars.aspx.
Woodward, Curt "Xconomist of the Week: Helen Greiner's CyPHy Works Unveils Drones" Xconomy, Inc. Dec. 3, 2012 (3 pages) http://www.warwickmills.com/Protective-Fabrics-Mars.aspx.
Grizzly Analytics home page—http://www.grizzlyanalytics.com/home.html.

* cited by examiner

TECHNIQUES FOR AUTONOMOUSLY CALIBRATING AN AUDIO SYSTEM

BACKGROUND

Field of the Embodiments of the Invention

Embodiments of the present invention generally relate to audio signal processing and, more specifically, to an autonomous audio calibration system.

Description of the Related Art

Audio systems, such as systems used in music venues, movie theaters, and sports stadiums, typically include tens or hundreds of speakers, the output of which must be carefully calibrated in order to ensure a pleasant and relatively uniform audio experience across a wide variety of listening positions. Consequently, such audio systems often include advanced digital signal processing platforms that enable a sound engineer to precisely adjust the sound pressure level, frequency characteristics, phase, etc. of each speaker included in the audio system. Accordingly, using a digital signal processing platform, a sound engineer is able to control the sound output of each speaker to compensate for speaker location, frequency response, acoustic characteristics of the venue, and other factors that may affect the audio experience at certain locations within the listening environment.

In order to calibrate an audio system for use in a particular listening environment, an audio engineer must acquire sound measurements at multiple locations within the environment. Specifically, in order to acquire each sound measurement, the audio engineer typically positions a calibration microphone on a microphone stand at the desired location and plays a series of audio samples through the speakers. The sounds recorded by the calibration microphone are then analyzed (e.g., via a comparison to the original audio sample) in order to determine which adjustments (e.g., adjustments to sound pressure level, frequency characteristics, phase, etc.) need to be made to which speakers.

Although the calibration technique described above enables an audio engineer to compensate for complex acoustic environments and varied listening positions, the calibration process is extremely time-consuming. For example, in a large venue, such as a sports stadium or amphitheater, acquiring sound measurements from enough locations within the listening environment to perform an accurate calibration may take several weeks. Furthermore, calibration of an audio system that is performed before a performance—when a venue is relatively unoccupied—may produce unsatisfactory results when the venue is populated with hundreds of listeners, each of which absorbs sound and, thus, affects the acoustic characteristics of the venue. As result, even when a comprehensive calibration of an audio system is performed beforehand for a particular venue, the listening experience produced by the audio system during a live performance may be suboptimal.

As the foregoing illustrates, techniques that enable an audio system to be more effectively calibrated would be useful.

SUMMARY

One embodiment of the present invention sets forth a method for calibrating an audio system. The method includes transmitting information to a robotic vehicle for positioning a microphone at a plurality of different listening locations within a listening environment and, for each different listening location, acquiring a sound measurement via the microphone. The method further includes calibrating at least one audio characteristic of the audio system based on the sound measurements acquired at the different listening locations.

Further embodiments provide, among other things, a system and a non-transitory computer-readable medium configured to implement the method set forth above.

At least one advantage of the disclosed technique is that sound measurements can be acquired from a variety listening locations in a more efficient manner, without requiring a sound engineer to manually move a microphone within the listening environment. Additionally, embodiments that implement an aerial vehicle to acquire sound measurements enable calibration to be more easily performed when a listening environment is densely populated (e.g., during a live performance), since the aerial vehicle can navigate above the audience. Furthermore, the disclosed techniques allow the effects of propulsion noise (e.g., produced by an aerial vehicle in which a calibration microphone is disposed) to be reduced.

BRIEF DESCRIPTION OF THE SEVERAL VIEWS OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

Figure 1:
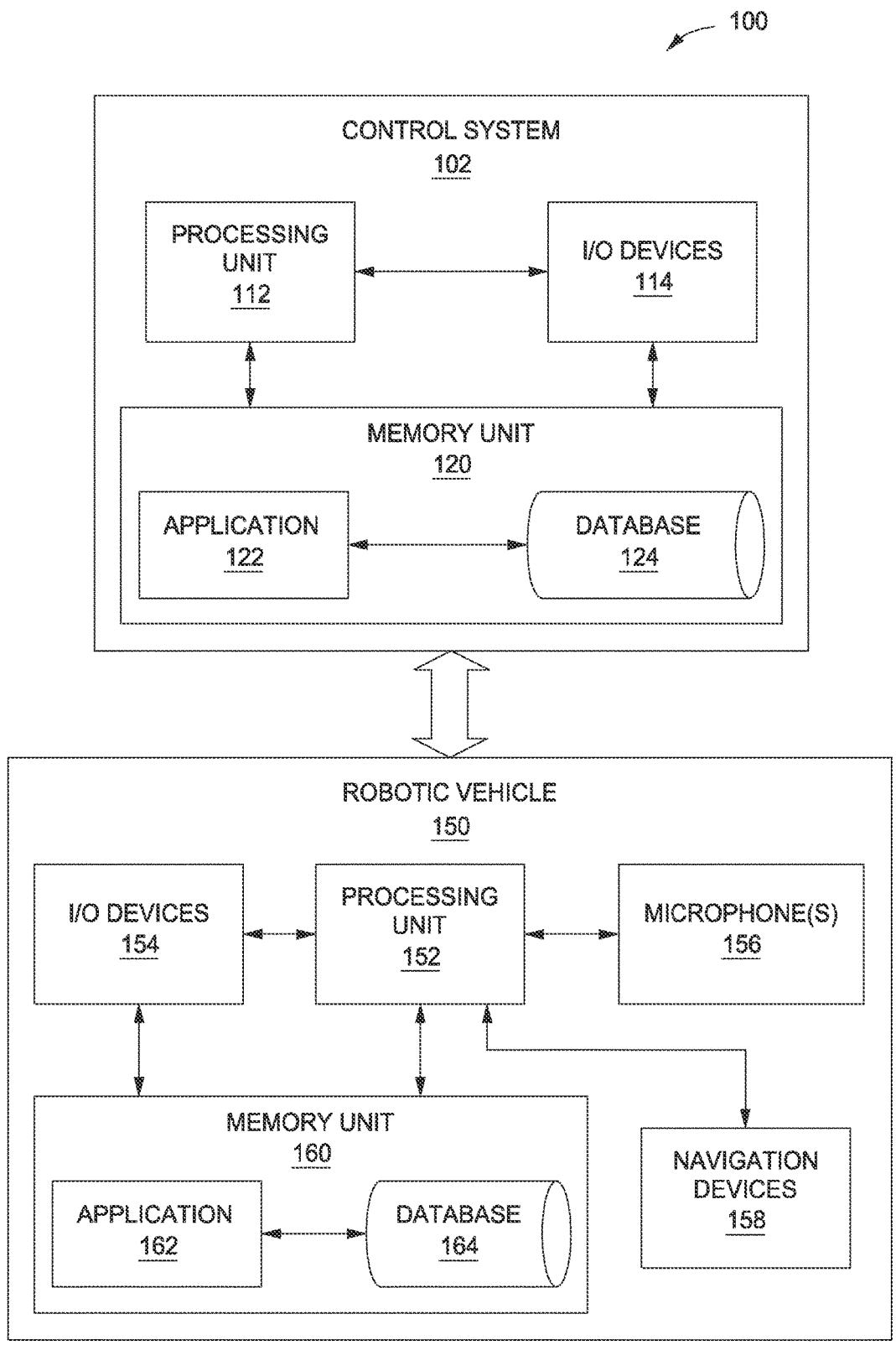
FIG. 1 is a block diagram of a calibration system for calibrating an audio system, according to various embodiments.

FIG. 1 is a block diagram of a calibration system 100 for calibrating an audio system, according to various embodiments. As shown, calibration system 100 includes, without limitation, a control system 102 and a robotic vehicle 150. Control system 102 includes a processing unit 112, input/output (I/O) devices 114, and a memory device 120. Memory device 120 includes an application 122 configured to interact with a database 124. Robotic device 150 includes a processing unit 152, input/output (I/O) devices 154, one or more microphones 156, navigation device(s) 158, and a memory device 160. Memory device 160 includes an application 162 configured to interact with a database 164.

In various embodiments, the robotic vehicle 150 includes an aerial vehicle, such as an unmanned aerial vehicle (UAV) (commonly referred to as a drone), that is controlled via the control system 102 in order to acquire sound measurements from multiple locations within a listening environment. For example, and without limitation, a user may interact with the control system 102 (e.g., via application 122) to specify locations within a listening environment (e.g., a music venue, movie theater, home theater, amusement park, sports stadium, etc.) at which sound measurements are to be acquired. The control system 102 then communicates with the robotic vehicle 150 to cause the robotic vehicle 150 to navigate to the specified locations. Upon reaching each location within the listening environment, the control system 102 further causes the robotic vehicle 150 to acquire a sound measurement via one or more microphones 156 coupled to the robotic vehicle 150. The sound measurements acquired by the robotic vehicle 150 are then transmitted to the control system 102 (e.g., via a wired connection and/or wireless connection) and/or stored in the database 164 of the robotic vehicle 150 and later transferred to the control system 102.

In some embodiments, sound measurements acquired by the robotic vehicle 150 are analyzed by the control system 102 in order to calibrate one or more aspects of an audio system. For example, and without limitation, sound measurements may be acquired at multiple locations within a listening environment, such as an amphitheater or movie theater, in order to calibrate the sound pressure levels of speakers included in the listening environment, ensuring that relatively uniform sound levels are produced at each seat included in the listening environment. In the same or other embodiments, sound measurements acquired by the robotic vehicle 150 are used for non-calibration purposes, such as to monitor noise levels and/or detect certain types of sounds within a listening environment. For example, and without limitation, sound measurements may be automatically acquired by the robotic vehicle 150 to measure crowd noise, construction noise, automotive noise, and the like at multiple locations within a variety of listening environments.

In various embodiments, aspects of the control system 102 may be implemented as a standalone module and/or aspects of the control system 102 may be integrated within other components, such as within a mixing console, an amplifier, a digital signal processing (DSP) unit, an audio/video receiver, a display, and/or within the robotic vehicle 150 itself. Processing unit 112 included in the control system 102 may include a central processing unit (CPU), digital signal processing unit (DSP), and so forth. The processing unit 112 is configured to transmit sampling locations and/or navigation instructions to the robotic vehicle 150 via an I/O device 114 in order to cause the robotic vehicle 150 to navigate to, and acquire sound measurements at, each location within a listening environment. Additionally, the processing unit 112 is configured to receive (e.g., via an I/O device 114) sound measurements acquired via the microphone(s) 156 and analyze the sound measurements in order to generate calibration data that indicates how one or more characteristics of an audio system (e.g., sound pressure level, frequency response, phase, etc.) should be modified. In some embodiments, the processing unit 112 generates calibration data by executing application 122, which then stores the calibration data, sound measurements, audio parameters, navigation data, etc. in database 124.

As described above, the robotic vehicle 150 may include an aerial vehicle, such as a drone. The aerial vehicle may include a commercially available robotics platform having 1 to 8 (or more) propulsion pods attached to a body. For example, the aerial vehicle may include a quadcopter (4 propulsion pods), a hexacopter (6 propulsion pods), and an octocopter (8 propulsion pods). Additionally, the aerial vehicle may include a robotics platform that implement a fixed wing design and/or coaxial rotors that are designed to compensate for rotor torque. In general, the aerial vehicle may be any size or weight. However, in some embodiments, the aerial vehicle is approximately 50 to 1500 grams. In other embodiments, the robotic vehicle 150 may include other types of robotic vehicles, such as vehicles having wheels (e.g., a remote-controlled car), human-like robots, animal-like robots, and the like.

Processing unit 152 included in the robotic vehicle 150 may include a central processing unit (CPU), digital signal processing unit (DSP), and so forth. The processing unit 152 is configured to receive navigation instructions (e.g., via I/O devices 154 and/or navigation device(s) 158) and operate one or more engines and/or motors included in the robotic vehicle 150 to cause the robotic vehicle 150 to navigate to, and acquire sound measurements at, specified locations within a listening environment. For example, and without limitation, the processing system 152 may control the operation of a propulsion and/or steering system included in the robotic vehicle 150, such as by stabilizing the robotic vehicle 150 (e.g., maintaining trajectory and altitude) and avoiding collisions with objects, people, other robotic vehicles, etc.). Alternatively, propulsion and steering system of the robotic vehicle 150 may be controlled by the control system 102 or by a standalone computer system.

The processing unit 152 may be configured to acquire sound measurements via the microphone(s) 156 and transmit (e.g., via an I/O device 154) the sound measurements to the control system 102. In some embodiments, the processing unit 152 navigates within a listening environment and/or acquires sound measurements by executing application 162, which may access navigation information from the database 164 and/or store sound measurements in the database 164. The microphone(s) 156 may include wireless or wired acoustic transducers, such as single microphone transducers, omnidirectional transducers, directional transducers, microphone arrays that allow dynamic beam forming, binaural recording devices (e.g., microphones disposed in a dummy head), and the like. Audio data acquired via the microphone(s) 156 may be wirelessly transmitted to the control system 102, where the audio data may be analyzed and/or passed to a monitoring system being operated by a mixing engineer.

In some embodiments, the direction and/or orientation of the microphone(s) 156 may be controlled. For example, and without limitation, the microphone(s) 156 may be coupled to a stabilization system, such as orientation stabilized gimbals. In some embodiments, the microphone(s) 156 are coupled to the robotic vehicle 150 via a gyroscopically stabilized connector that includes motors, gears, sensors, and/or controllers that enable the microphone(s) 156 to remain in substantially the same three-dimensional orientation relative to the listening environment, regardless of the orientation of the robotic vehicle 150. In the same or other embodiments, the microphone(s) 156 may be coupled to a motorized orientation system that is capable of panning, tilting, and yawing, enabling the microphone(s) 156 to be pointed in any direction, regardless of the orientation of the robotic vehicle 150. Further, in such embodiments, the control system 102 may track the head orientation of a user (e.g., by tracking the orientation of headphones worn by the user) and cause the motorized orientation system to pan, tilt, and/or yaw the microphone(s) 156 to substantially match the orientation and/or movements of the head of the user. For example, the motorized orientation system may mirror the orientation of the head of the user such that, if the user turns his or her head to the left relative to the listening environment, then the microphone(s) 156 are rotated to the left, if the user turns his or her head to the right relative to the listening environment, then the microphone(s) 156 are rotated to the right, and so on.

The navigation device(s) 158 included in the robotic vehicle 150 may provide location information to the processing unit 152 to enable the robotic vehicle 150 to navigate within a two-dimensional plane or three-dimensional space towards specified locations within the listening environment. Accordingly, the navigation device(s) 158 may include, without limitation, global-positioning system (GPS) devices, magnetic and inertial sensors, gyroscopes and accelerometers, visible light and thermal imaging sensors, laser and ultrasound based navigation devices, infrared based navigation devices, time-of-flight based sensors, and the like that enable the location of the robotic vehicle 150 to be tracked in relative coordinates (e.g., relative to the user or a marker positioned in the listening environment) or in absolute coordinates. The navigation device(s) 158 may provide sensor information to processing unit 152 and/or processing unit 112, which may use techniques such as optical flow detection for egomotion estimations. The navigation device(s) 158 may then output location data (e.g., 6DOF location data including XYZ coordinates and 3D orientation) to processing unit 152 and/or processing unit 112.

The navigation device(s) 158 may further include devices that are capable of detecting visual markers and/or radiofrequency transmitters that are located within a listening environment, enabling the robotic vehicle 150 to navigate more effectively within a particular listening environment, such as when GPS techniques cannot be implemented. For example, and without limitation, the navigation device(s) 158 may include sensors that track markers (e.g., passive reflective markers, active infrared markers, passive infrared projection on a wall or ceiling, etc.) located within the listening environment. The position of the robotic vehicle 150 in relative coordinates or absolute coordinates may then be determined based on the position(s) of the markers (e.g., via trilateration). In addition, when multiple robotic vehicles 150 are implemented, each robotic vehicle 150 can track markers and/or other proximate robotic vehicles 150 and transmit the locations of the markers and robotic vehicles 150 to other robotic vehicles 150, resulting in a self-localizing, ad-hoc network. For example, and without limitation, a "swarm" of robotic vehicles 150 may be tracked and coordinated via peer-to-peer localization techniques, simultaneous localization and mapping (SLAM) techniques, and utilizing depth sensors, motion trackers, computer vision techniques, etc.

The navigation device(s) 158 may further include and/or communicate with external sensors positioned within the listening environment. For example, and without limitation, an external sensor system may track the location of the robotic vehicle 150 via sensors that are mounted within the listening environment (e.g., on a wall, ceiling, ceiling trusses, etc.). In some embodiments, the external sensor system may track active or passive markers included on or in the robotic vehicle 150 using radiofrequency techniques, ultrasound techniques, optical techniques (e.g., techniques implemented by NaturalPoint Optitrack®, TrackIR®, and the like), and/or other techniques.

I/O devices 114 included in the control system 102 and/or I/O devices 154 included in the robotic vehicle 150 may include input devices, output devices, and devices capable of both receiving input and providing output. For example, and without limitation, I/O devices 114 and 154 may include wired and/or wireless communication devices that send data (e.g., location information, navigation instructions, sound measurements, etc.) between the control system 102 and the robotic device 150. Further, in some embodiments, the I/O devices 114 and 154 include one or more wired or wireless communication devices that send data to and/or receive data from an audio system that is being calibrated by the calibration system 100.

Each of memory unit 120 and memory unit 160 may include a single memory module or collection of memory modules. Software application 122 stored within the memory unit 120 may be executed by processing unit 112 to implement the overall functionality of the control system 102. Similarly, software application 162 stored within the memory unit 160 may be executed by processing unit 152 to implement the overall functionality of the robotic vehicle 150. Thus, software application 122 and/or software application 162 may coordinate the operation of the calibration system 100 as a whole.

In some embodiments, control system 102 and the robotic vehicle 150 are included in physically separate modules, enabling a user to interact with the control system 102 while the robotic vehicle 150 is automatically navigating to locations within a listening environment and acquiring sound measurements. However, in other embodiments, some or all of the components included in the control system 102 and robotic vehicle 150 may be combined. Additionally, various components included in each of the control system 102 and/or robotic vehicle 150 may be integrated into a single component. For example, and without limitation, each of processing unit 112 and processing unit 152 may be implemented as a system-on-a-chip (SoC) that includes one or more I/O devices 114, I/O devices 154, memory unit 120, and/or memory unit 160, respectively, integrated on a single die. Further, some or all of the components of the control system 102 and/or the robotic device 150 may be included in a mobile computing device, such as a tablet computer or cell phone, a media player, laptop, or a wearable computing device, such as arm-mounted or head-mounted devices, and so forth. In general, the embodiments disclosed herein contemplate any technically feasible system configured to implement the functionality of the calibration system 100.

Figure 2:
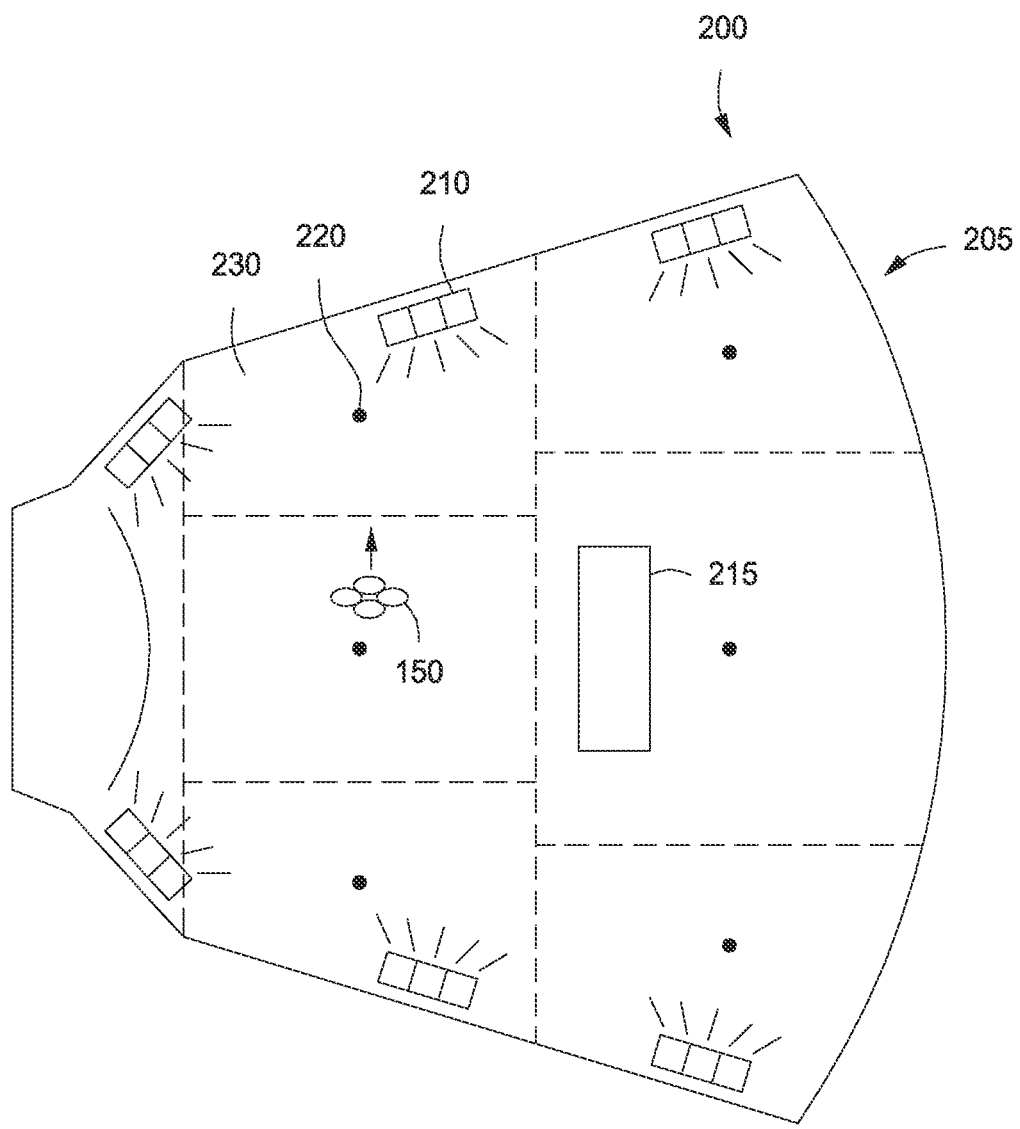
FIG. 2 illustrates an audio system that may be calibrated via the calibration system of FIG. 1, according to various embodiments.

FIG. 2 illustrates an audio system 200 that may be calibrated via the calibration system 100 of FIG. 1, according to various embodiments. As shown, the audio system 200 may include a plurality of speaker clusters 210 positioned in a listening environment 205, such as a music venue. For clarity, only six speaker clusters 210 are shown in FIG. 2. However, in other embodiments, the calibration system 100 may be used to calibrate other types of audio systems 200 included in any type of listening environment 205 and having any number of speakers or speaker clusters 210.

During operation of the calibration system 100, a user may specify one or more listening locations 220 at which sound measurements are to be acquired via the microphone (s) 156. For example, and without limitation, the user may interact with a graphical user interface (GUI) generated by the control system 102 and select the listening locations 220 at which the robotic vehicle 150 should acquire sound measurements. In some embodiments, the user may further specify when each of the sound measurements should be acquired. For example, and without limitation, a mixing engineer may specify that a sound measurement is to be acquired at one or more of a plurality of listening locations 220 at one or more specific times (e.g., at a time prior to a music event and once again at a time during the music event), periodically (e.g., once every five minutes, once every hour, etc.), and/or based on specific criteria (e.g., when an error associated with the audio system 200 is detected, when certain sound characteristics are detected, when certain types of audio samples are reproduced via the audio system 200, etc.). In a specific example, the robotic vehicle 150 may automatically navigate to a particular listening location 220 when an error or audio issue is detected proximate to the listening location 220 to enable a user to acquire sound measurements and attempt to resolve the error/issue.

In some embodiments, the GUI may be generated and/or displayed via a mobile or wearable device, such as a smartphone, smartwatch, tablet computer, or laptop. Additionally, with reference to FIG. 2, the GUI may be displayed on or proximate to a mixing console 215 that includes the control system 102 and is positioned within the listening environment 205, enabling the user to view the listening locations 220 as well as the operation of the robotic vehicle 150 as it navigates to each listening location 220. In addition to the GUI techniques described above, a user may specify which listening locations 220 the robotic vehicle 150 should sample and/or when the sampling should be performed using voice commands and/or hand-mounted or arm-mounted sensors. For example, and without limitation, the user may point to locations of the venue and say "Measure there!" In another non-limiting example, the user may say "Every 5 minutes, fly above the perimeter of the audience area" or "Ten minutes after the start of the show, fly to position XYZ and calibrate the sound field."

In the same or other embodiments, the listening environment 205 may be divided into a plurality of listening zones 230, each of which includes one or more listening locations 220. In such embodiments, the robotic vehicle 150 may acquire sound measurements at multiple listening locations 220 included in one or more of the listening zones 230. The sound measurements associated with a particular listening zone 230 may then optionally be processed together, such as by averaging and/or applying an algorithm to all of the sound measurements associated with the listening zone 230. Additionally, in some embodiments, a different robotic vehicle 150 may be assigned to acquire sound measurements from each of the listening zones 230, as discussed below in further detail in conjunction with FIGS. 3A-3C.

The control system 102 and robotic vehicle 150 may be programmed to operate in one or more different sampling modes. As described above, in a spot sampling mode, the robotic vehicle 150 navigates to one or more specific listening locations 220 within the listening environment 205 and acquires sound measurements via the microphone(s) 156. The robotic vehicle 150 may then automatically return to the docking station (e.g., proximate to the mixing console 215) from which it originated. For example, and without limitation, at each listening location 220, the robotic vehicle 150 may land or perch on a floor, wall, or ceiling, reduce power to or turn off one or more engines, acquire a sound measurement (e.g., for 2-5 seconds), and automatically proceed to the next listening location 220 to acquire the next sound measurement. In some embodiments, at each listening location 220, instead of (or in addition to) landing or perching, the robotic vehicle 150 may extend a filament or tether to which a microphone 156 is coupled. A sound measurement may then be acquired while the microphone 156 is extended away from the robotic vehicle 150, reducing the effect of propulsion noise on the sound measurement and/or enabling the microphone 156 to be positioned at a specific height (e.g., an average ear level). When implemented in a setting where a live audience is present, the spot sampling mode (and/or the continuous sampling mode described below) may enable an audio engineer to "listen in" on a performance from the perspective of an audience member (e.g., by configuring the robotic vehicle 150 to fly above certain locations in the audience), without substantially interfering with the audience's enjoyment of the performance.

In a continuous sampling mode, the robotic vehicle 150 acquires one or more continuous sound measurements via the microphone(s) 156 while navigating between listening locations 220 and/or while navigating along a particular path (e.g., a path specified by the user) within the listening environment 205. The robotic vehicle 150 may then automatically return to the docking station from which it originated. The continuous sampling mode enables a user to experience an "auditory telepresence" by providing the user with a continuous audio stream associated with larger regions of the listening environment 205. Moreover, the continuous sampling mode enables a user to perform a sweeping pass through a listening environment 205 to acquire a fast, cursory auditory impression of a large area. For example, and without limitation, the continuous sampling mode may allow an audio engineer to determine, within seconds, how a sound mix changes from the front of a listening environment 205 (e.g., a stage) to the back of the listening environment 205. Further, in some embodiments, the spot sampling mode is implemented in conjunction with the continuous sampling mode.

While in the continuous sampling mode, the robotic vehicle 150 may extend a filament or tether to which a microphone 156 is coupled, as described above, in order to reduce the effect of propulsion noise on continuous sound measurements and/or to position the microphone 156 at a specific height within the listening environment 205. In general, in order to acquire accurate sound measurements, the microphone(s) 156 should remain relatively stationary. However, when acquiring continuous sound measurements (e.g., while the robotic vehicle 150 is moving through the air), the effects of microphone 156 movement (e.g., wind noise on the microphone 156 transducers) may be reduced by using windscreens or wind muffs on the microphone(s) 156. In addition, frequency-related effects caused by microphone movement, such as the Doppler shift, may be removed via digital signal processing techniques. For example, and without limitation, the speed and direction in which the robotic vehicle 150 is traveling relative to a speaker or speaker cluster 210 while acquiring a sound measurement (e.g., a continuous sound measurement or a spot sound measurement) may be used to compensate for the effect of the Doppler shift on the frequencies of sound measurements acquired via the microphone(s) 156. In some embodiments, a continuous sound measurement (or spot sound measurement) that is acquired while the robotic vehicle 150 is moving may be processed to remove the Doppler shift(s) based on the speed and direction of the robotic vehicle 150 relative to each speaker or speaker cluster 210 that substantially contributes to the sound measurement.

When processing sound measurements acquired via the robotic device 150, the control system 102 may need to take into consideration the acoustic delay that occurs between the speaker clusters 210 and the microphone(s) 156. When the robotic vehicle 150 is performing spot sampling, the acoustic delay may be determined based on the distance of the microphone(s) 156 from each speaker or speaker cluster 210. However, when the robotic vehicle 150 is performing continuous sampling, the acoustic delay will be variable. In such embodiments, the variable acoustic delay may be determined based on analyzing a model of the listening environment 205, ultrasonic timing signals outputted by one or more of the speakers or speaker clusters 210, and/or by comparing the sound measurements acquired by the microphone(s) 156 to the audio stream being outputted by the audio system 200 (e.g., an audio stream generated by mixing console 215).

Figure 3A:
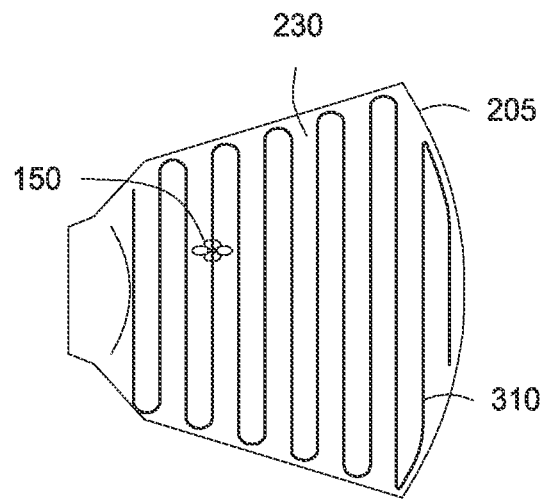
FIGS. 3A-3C illustrate techniques for acquiring sound measurements within a listening environment via the calibration system of FIG. 1, according to various embodiments.
Figure 3B:
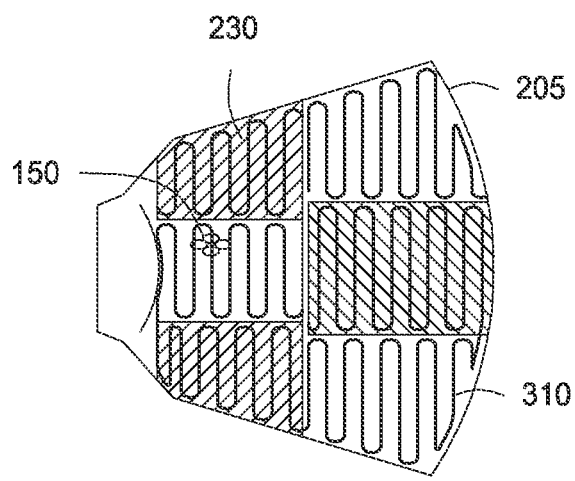
Figure 3C:
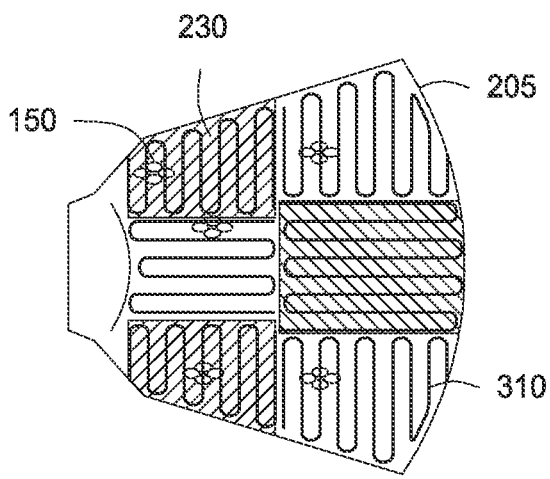

FIGS. 3A-3C illustrate techniques for acquiring sound measurements within a listening environment 205 via the calibration system 100 of FIG. 1, according to various embodiments. As described above, a listening environment 205 may be divided into listening zones 230, and sound measurements may be acquired by the robotic vehicle 150 for each listening zone 230. For example, and without limitation, as shown in FIG. 3A, the listening environment 205 may include a single listening zone 230. In such embodiments, a single robotic vehicle 150 (or multiple robotic vehicles 150) may acquire spot sound measurements and/or continuous sound measurements by navigating along a path 310 (or paths 310) within the listening zone 230.

In other embodiments, a listening environment 205 may be divided into multiple listening zones 230 each of which may be monitored (by acquiring spot sound measurements and/or via continuous sound measurements) via the same robotic vehicle 150 (as shown in FIG. 3B) or a different robotic vehicle 150 (as shown in FIG. 3C). Although one type of path 310 is shown (a serpentine path), any type of path 310 may be used when acquiring sound measurements within a listening environment 205. Further, each listening zone 230 may include a different type of path 310 that is tailored to the specific needs of the audio system 200 components, acoustic characteristics, and/or listeners (e.g., audience members) associated with the listening zone 230.

Figures 4A, 4B:
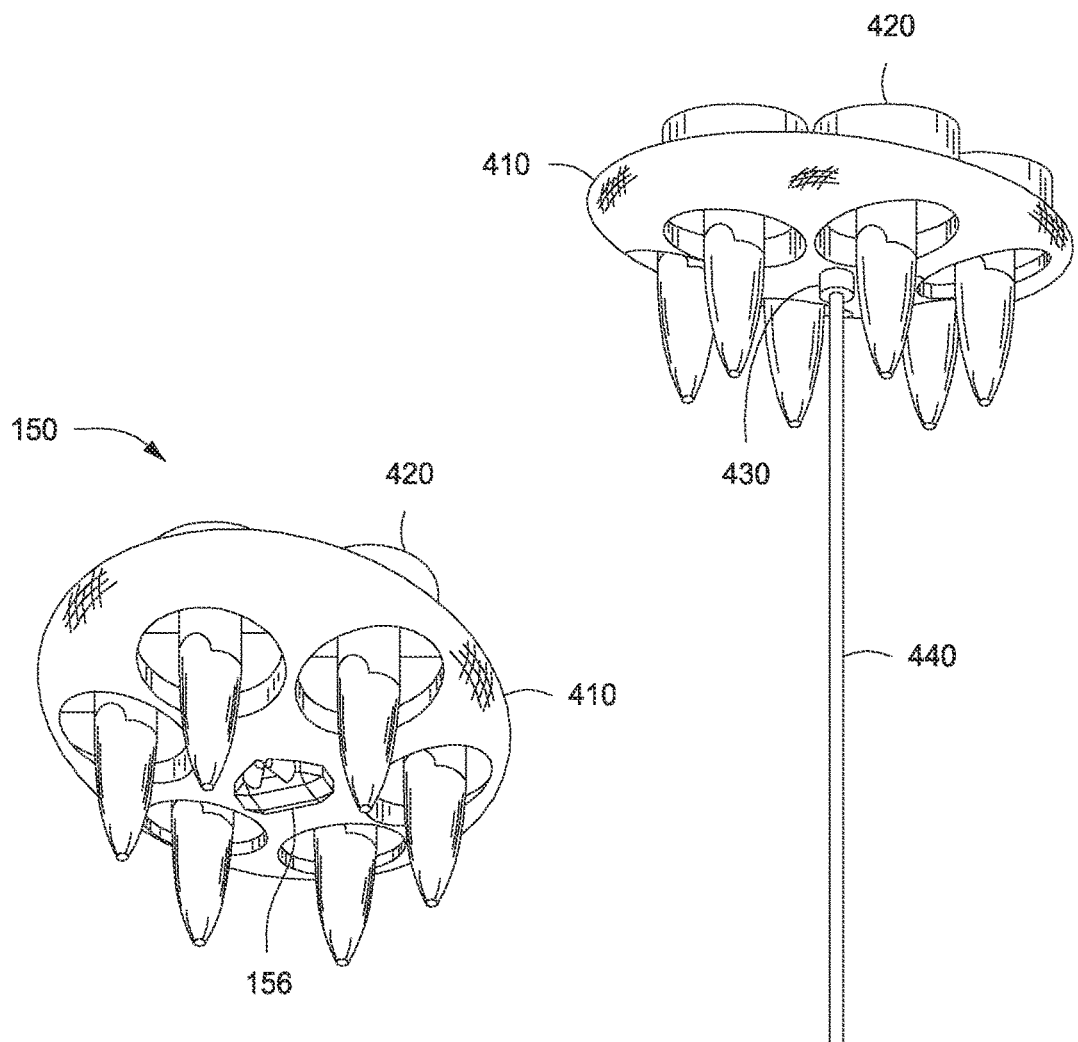
FIGS. 4A and 4B illustrate various microphone configurations that may be implemented with the calibration system of FIG. 1, according to various embodiments.

FIGS. 4A and 4B illustrate various microphone 156 configurations that may be implemented with the calibration system 100 of FIG. 1, according to various embodiments. As shown in FIG. 4A, one or more microphones 156 may be coupled to the body 410 of the robotic vehicle 150. For example, and without limitation, two microphones 156 may be coupled to the body 410 of the robotic vehicle 150 in order to simulate a binaural listening experience. Accordingly, sound measurements acquired by the microphones 156 and transmitted to the user may more accurately reflect a binaural listening experience of an audience member.

When sound measurements are acquired via the microphone(s) 156 while one or more engines 420 of the robotic vehicle 150 are powered on, propulsion noise may interfere with the sounds measurements. Accordingly, in some embodiments, a propulsion noise cancellation algorithm may be applied to sound measurements to reduce to effects of propulsion noise. For example, and without limitation, in embodiments that include multiple microphones 156, the sounds measurements acquired by each of the microphones 156 may be compared to isolate the sound characteristics of the propulsion noise, such as by generating a "composite sound" of the propulsion noise. One or more of the sound measurement may then be processed to remove or reduce the effects of the propulsion noise (e.g., using techniques such as Blind Source Separation). In embodiments that include a single microphone 156, the sound characteristics of the propulsion noise at various engine power levels may be determined prior to calibrating the audio system 200 (e.g., when no audio samples are being reproduced by the audio system 200). Sound measurements acquired via the microphone 156 may then be processed to remove or reduce the effect of propulsion noise based on the predetermined engine sound characteristics. In addition, the microphone(s) 156 may include one or more directional microphones and/or beamforming microphone arrays that enable sound measurements to be acquired in specific directions (e.g., away from an engine), without being significantly affected by propulsion noise.

In the same or other embodiments, in order to reduce the effects of propulsion noise on sound measurements, one or more microphones 156 may be coupled to a filament or tether and extended a distance from the engines 420 of the robotic vehicle 150. For example, and without limitation, as shown in FIG. 4B, a tether 440 to which a microphone 156 is coupled may be extended from the robotic vehicle 150 via a motor 430 (e.g., by unspooling a tether that may be stored on a reel or cylindrical device attached to the robotic vehicle 150 and used for winding and stowing the tether). One or more spot sound measurements and/or continuous sound measurements may then be acquired while the microphone 156 is extended away from the engine(s) 420 of the robotic vehicle 150. Alternatively, the filament and/or tether 440 may have a fixed length, and a microphone 156 may remain the fixed length away from the engine(s) 420 during operation of the robotic vehicle 150.

Figure 5A:
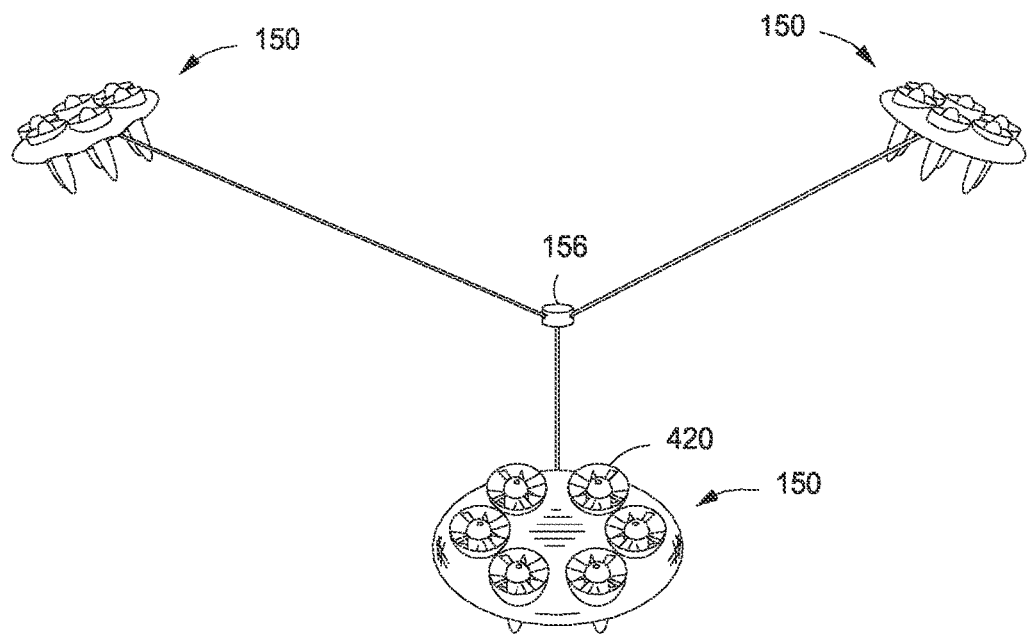
FIGS. 5A-5D illustrate a formation of robotic vehicles that may be implemented with the calibration system of FIG. 1, according to various embodiments.

FIGS. 5A-5D illustrate a formation of robotic vehicles 150 that may be implemented with the calibration system 100 of FIG. 1, according to various embodiments. As shown in FIG. 5A, multiple robotic vehicles 150 may coordinate operation in order to acquire sound measurements. For example, and without limitation, a microphone 156 may be suspended between multiple robotic vehicles 150 (e.g., two or more UAVs) in order to position the microphone 156 at a greater distance from the engines 420 of the robotic vehicles 150. During calibration of an audio system 200, the robotic vehicles 150 may then fly in formation, position the microphone(s) 156 at the listening locations 220 specified by the control system 102, and acquire spot sound measurements and/or continuous sound measurements via the microphone(s) 156.

In various embodiments, other techniques for reducing the impact of propulsion noise on sound measurements may be implemented. In one such technique, a gripping mechanism coupled to a tether may be ejected from the robotic device 150 and attached to a ceiling or to a structure proximate to the ceiling (e.g., a support beam). The robotic vehicle may then suspend from the ceiling/structure, and the engine(s) 420 of the robotic vehicle 150 may be powered down in order to acquire sound measurements. Once the sound measurement(s) have been acquired, the robotic vehicle 150 may release the gripping mechanism, wind the tether, and proceed to the next listening location 220. If there are dual tethers and gripping mechanisms that are used in alternating ways, this technique can be used for forward motion in a manner that is similar to the locomotion technique of brachiation or "arm swinging" used by primates and comic book superheroes.

In another technique for reducing the impact of propulsion noise on sound measurements, one or more wireless microphones 156 may be deployed from the robotic vehicle 156 and attached temporarily to a wall, ceiling, or other structure. Sound measurements may then be acquired via the microphone(s) 156, without the presence of propulsion noise, and the robotic vehicle 150 may retrieve the microphone(s) 156 at a later time. In yet another technique for reducing the impact of propulsion noise, the microphone 156 may be ejected from the robotic vehicle 150, into the air, and then caught by the robotic vehicle 150. Sound measurements may then be acquired while the microphone 156 is in the air, away from the engine(s) 420 of the robotic vehicle 150. In another technique, a quieter, secondary propulsion system may be activated when the engine(s) 420 of the robotic device 150 are powered down. Accordingly, lift may then be temporarily provided to the robotic device 150 while propulsion noise is being reduced. In some embodiments, the secondary propulsion may be provided by emitting compressed gases (such as air) and/or via the rotation of one or more gyroscopic wheels.

Figure 5B:
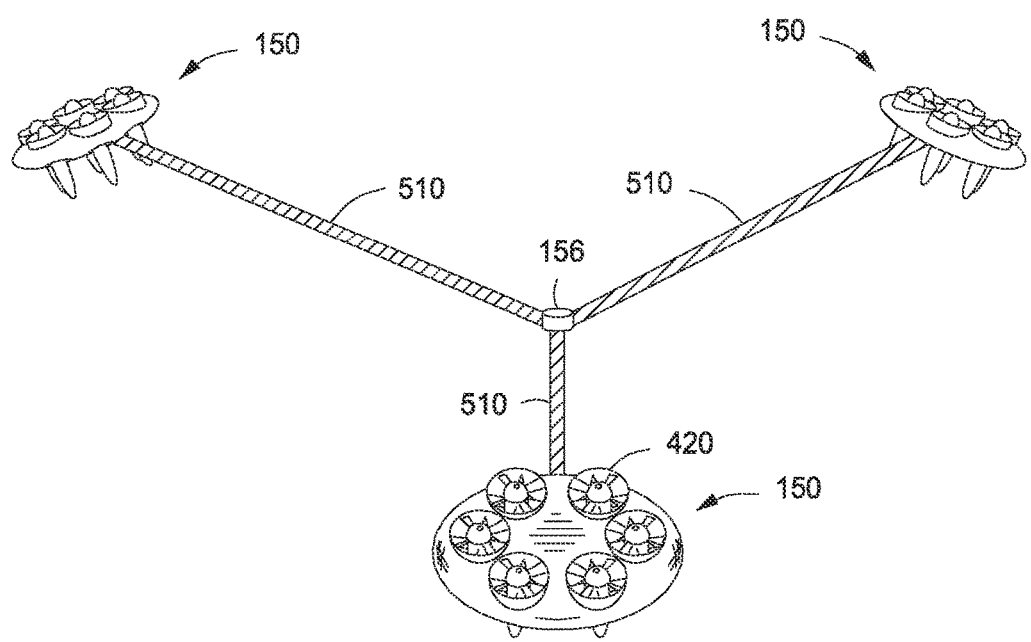
Figure 5C:
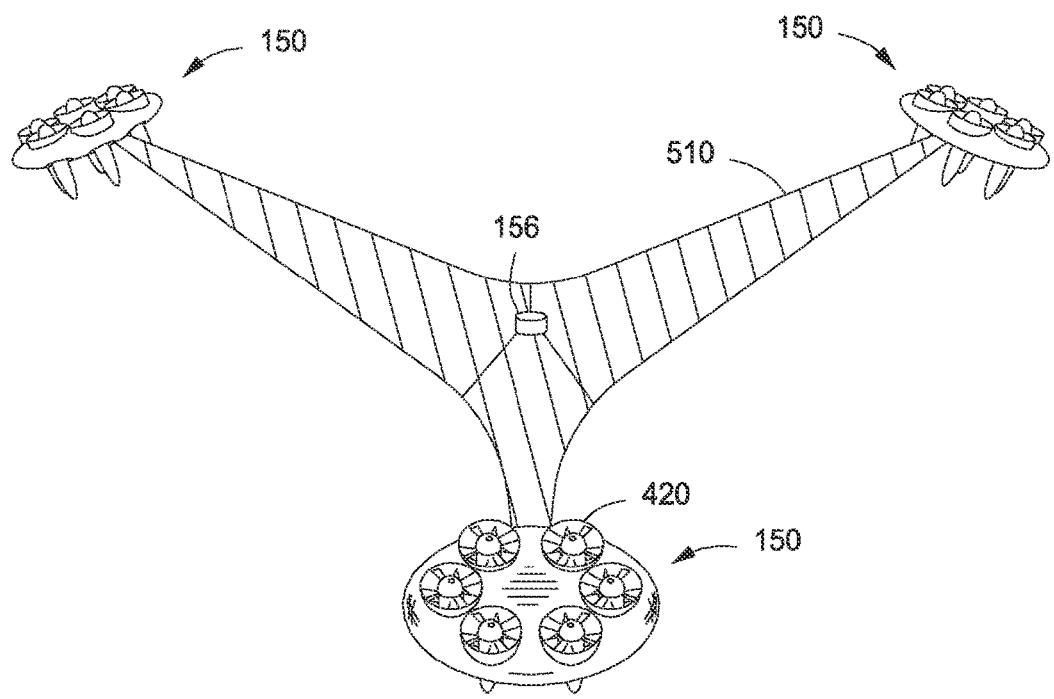
Figure 5D:
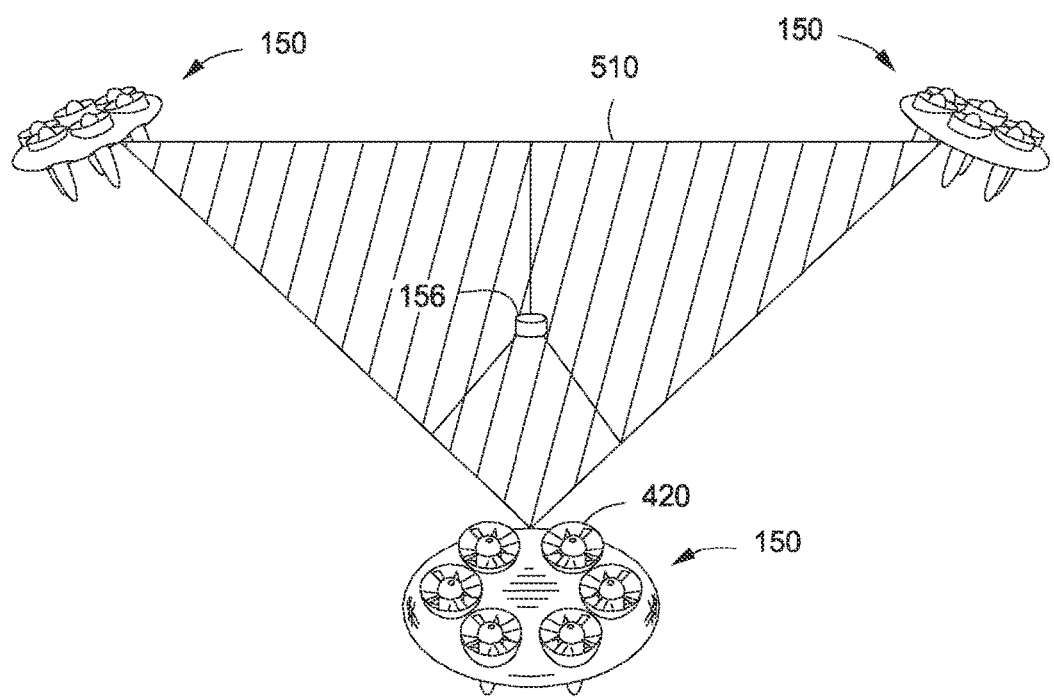

In yet another technique for reducing the impact of propulsion noise on sound measurements, power being supplied to one or more of the engine(s) 420 is cut or reduced. Then, while the robotic vehicle(s) 150 are descending (e.g., in free fall) and the propulsion noise is reduced or eliminated, one or more sound measurements are acquired. Additionally, in such embodiments, an optional wind drag element 510, such as an acoustically transparent parachute, may help stabilize the robotic vehicle(s) 150 and reduce the rate of falling. When combined with a swarm of robotic vehicles 150—where the microphone 156 is suspended between the swarm—the wind drag element 510 can be coupled to the microphone 156 and/or the robotic vehicles 150 to allow the microphone 156 and/or the robotic vehicles 150 to fall at a slower rate when the swarm powers down their engines. For example, and without limitation, as shown in FIG. 5B, the wind drag element 510 (e.g., a parachute) may be attached to one or more tethers that couple the swarm of robotic vehicles 150 to one another. The wind drag element 510 may then be deployed while the engines 420 are powered down in order to reduce the rate at which the microphone 156 and/or robotic vehicles 150 are falling, as shown in FIGS. 5C and 5D. Once the sound measurements have been acquired and/or power has been restored to the engines 420, the wind drag mechanism may be retracted, enabling the robotic vehicle(s) 150 to more effectively navigate to the next location.

In general, deploying the wind drag mechanism 510 may be accomplished via any suitable device, including, without limitation, an umbrella mechanism, a window blinds mechanism, an accordion mechanism, a spring mechanism, a motorized wire system, a motorized filament system, a hydraulic or pneumatic system, and the like. Additionally, although FIGS. 5B-5D illustrate the wind drag mechanism 510 as being coupled to the tethers of the swarm, in other embodiments, the wind drag mechanism 510 may be deployed from the sides of the robotic vehicle(s) 150 (e.g., coupled to and deployed from the perimeter of the body of the robotic vehicle 150) or deployed from above the robotic vehicle(s) 150 (e.g., coupled to the robotic vehicle 150 via an umbrella mechanism or traditional parachute configuration located above the robotic vehicle 150).

Figure 6A:
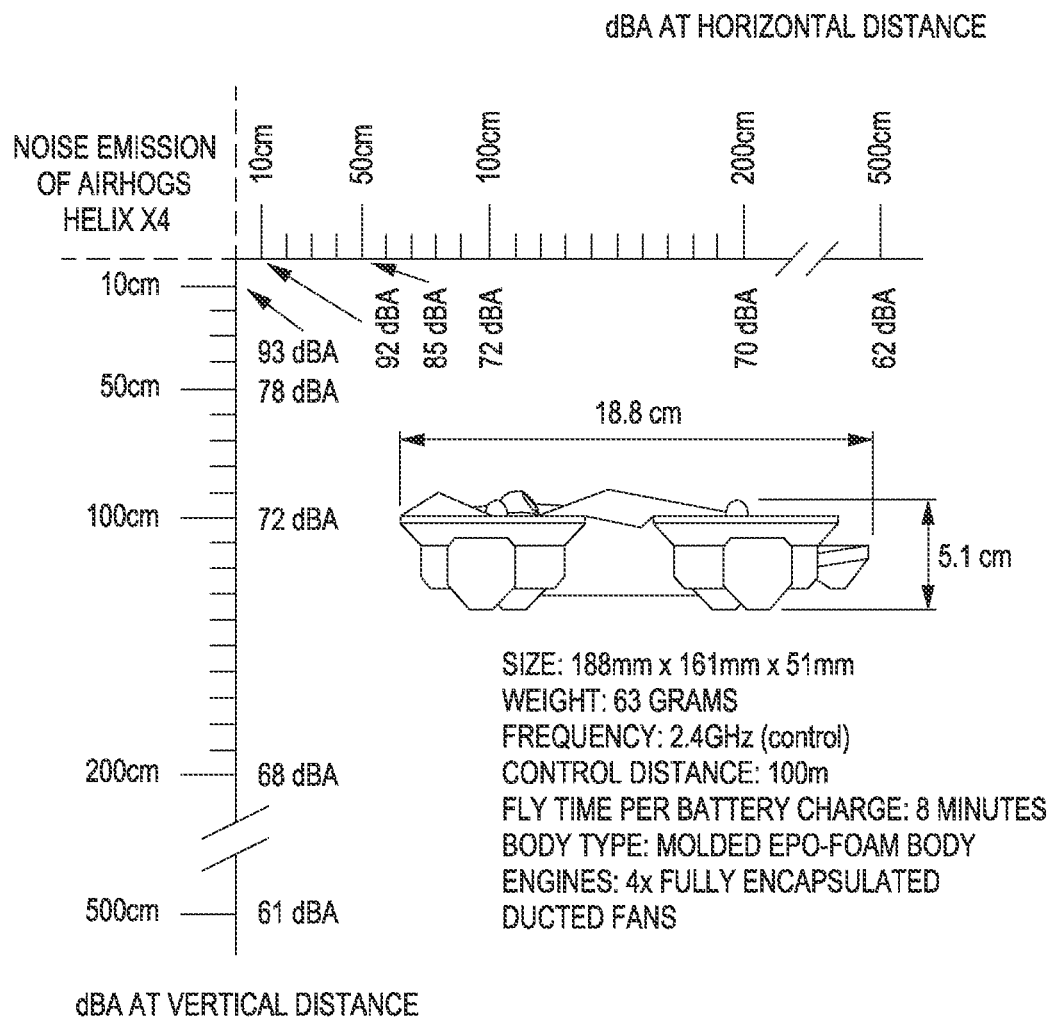
FIGS. 6A-6C illustrate measured noise levels of various robotic vehicles as a function of distance from each robotic vehicle, according to various embodiments.
Figure 6B:
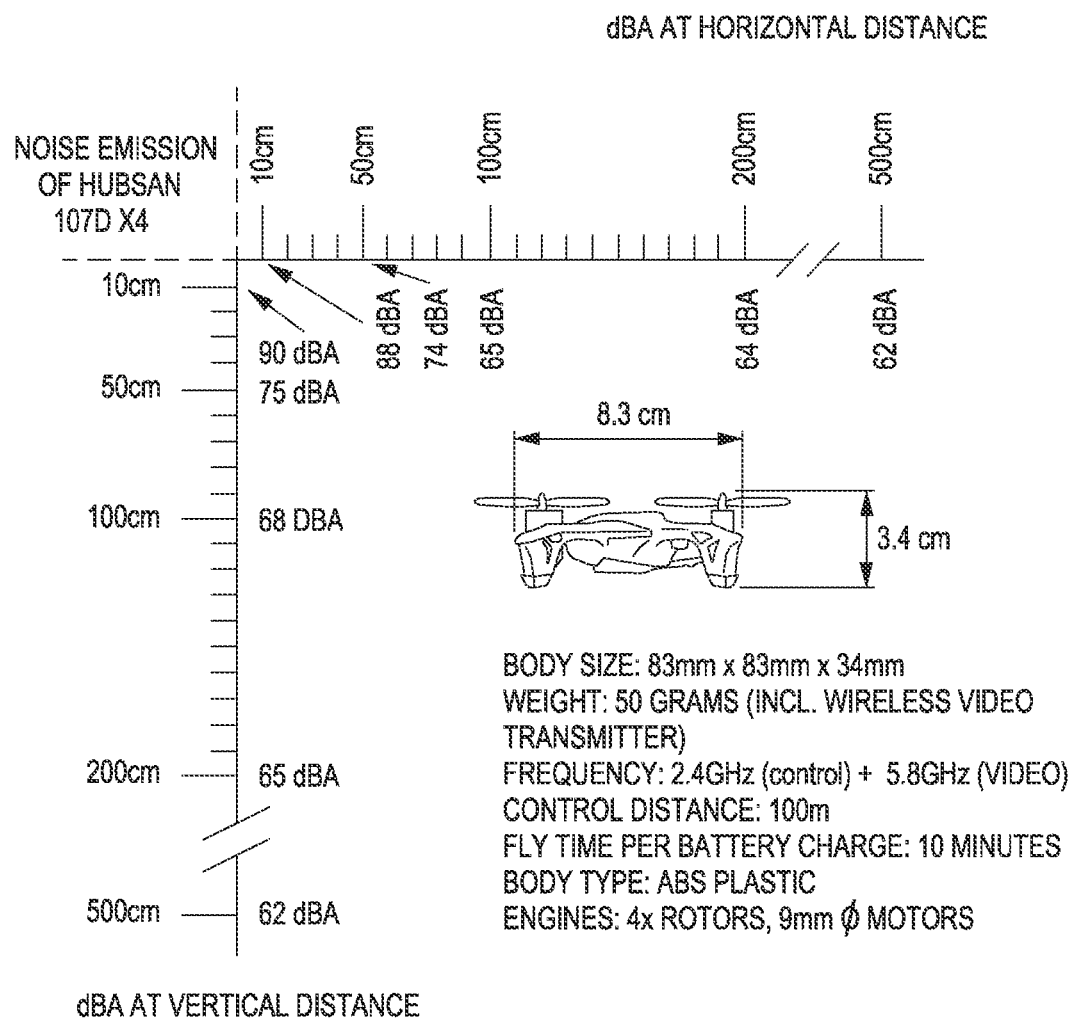
Figure 6C:
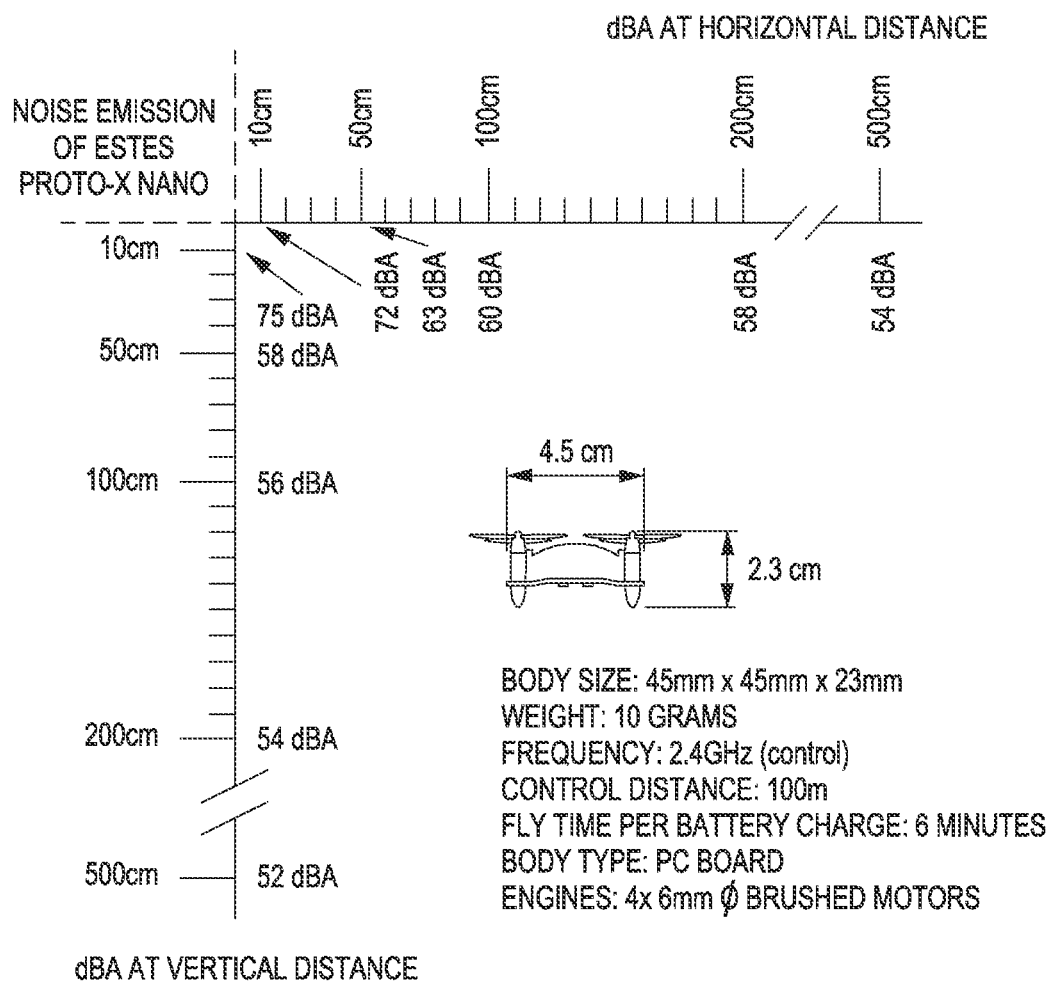

FIGS. 6A-6C illustrate measured noise levels of various robotic vehicles 150 as a function of distance from each robotic vehicle 150, according to various embodiments. As shown, the propulsion noise generated by commercially available UAVs drops significantly with distance from the engines. For example, as shown in FIG. 6A, moving a microphone 156 from approximately 10 centimeters away from an Air Hogs Helix X4 to approximately 200 centimeters away from the Air Hogs Helix X4 reduces the propulsion noise by approximately 25 dBA. Similar propulsion noise level reductions are shown in FIGS. 6B and 6C. In general, FIGS. 6A-6C illustrate that a tether/filament of approximately 100 centimeters (either vertically or horizontally positioned relative to the robotic vehicle 150) may reduce propulsion noise to an acceptable level such that sound measurements can be accurately acquired even if the engine(s) 420 remain on during the sound measurements. Accordingly, by positioning the microphone(s) 156 at a distance from the UAV (e.g., as described above in conjunction with FIGS. 4B and 5), the effects of propulsion noise on sound measurements may be significantly reduced.

Furthermore, in some embodiments, the noise generated by the engines of the robotic vehicle 150 is significantly quieter than the signal (e.g., the audio samples) to be acquired by the microphone(s) 156. For example, and without limitation, the sound pressure levels associated with a music concert are significantly higher than the sound pressure levels generated by the engines of the UAVs shown in FIGS. 6A-6C, particularly when the tether/filament and/or formation techniques described in FIGS. 4B and 5 are implemented. Consequently, propulsion noise generated by a robotic vehicle 150 is unlikely to significantly affect acquired sound measurements in such listening environments 205.

Figure 7A:
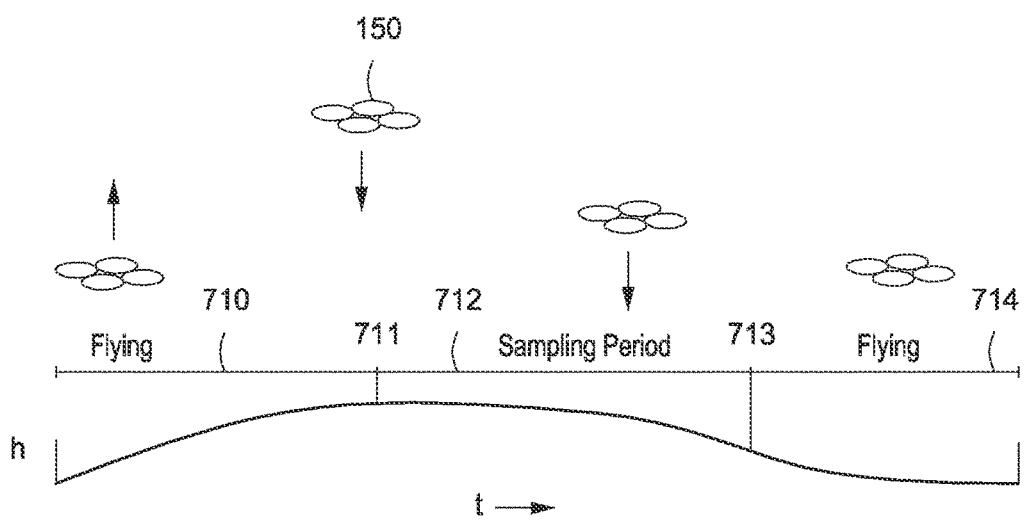
FIGS. 7A-7C illustrate propulsion noise reduction techniques and flight paths that may be implemented when acquiring sound measurements via the calibration system of FIG. 1, according to various embodiments.
Figure 7B:
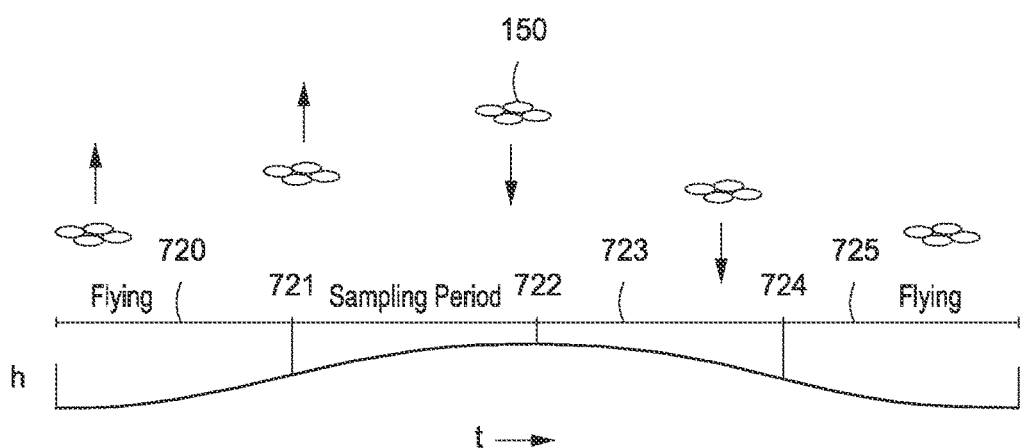
Figure 7C:
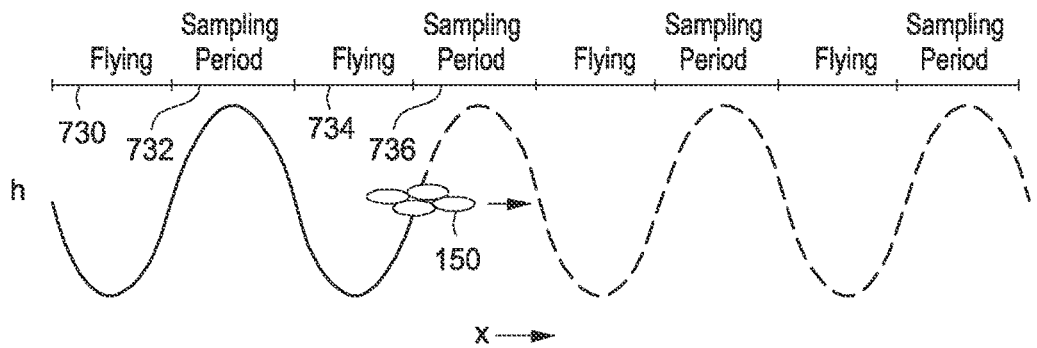

FIGS. 7A-7C illustrate propulsion noise reduction techniques and flight paths that may be implemented when acquiring sound measurements via the calibration system 100 of FIG. 1, according to various embodiments. In another technique for reducing the effects of propulsion noise on sound measurements acquired by the robotic vehicle 150, the power supplied to one or more of the engines 420 included in the robotic vehicle 150 may be reduced (e.g., by shutting off the engine(s) 420) while the robotic vehicle 150 is flying. For example, and without limitation, as shown in FIG. 7A, the robotic vehicle 150 may ascend towards a higher altitude during time period 710 and, once the robotic vehicle 150 reaches the higher altitude, the power being supplied to the engine(s) 420 is reduced at time 711. Then, during time period 712, while the robotic vehicle 150 is descending (e.g., in free fall) one or more sound measurements are acquired while the propulsion noise is reduced or eliminated. Next, at time 713, the acquisition of sound measurements stops, and power applied to the engine(s) 420 is increased in order to enable the robotic vehicle 150 to continue flying during time period 714.

In another technique, shown in FIG. 7B, the robotic vehicle 150 ascends quickly towards a higher altitude during time period 720. Then, at time 721, power supplied to the engine(s) 420 of the robotic vehicle 150 is reduced, while the robotic vehicle 150 is still traveling in an upward direction. One or more sound measurements are then acquired during time period 723. Moreover, due to the initial ascension and upward momentum of the robotic vehicle 150, during the first portion of time period 723 (e.g., prior to time 722), the robotic vehicle 150 continues to ascend. Once time 722 is reached, the robotic vehicle 150 begins to descend. Next, at time 724, the acquisition of sound measurements stops, and power applied to the engine(s) 420 is increased in order to enable the robotic vehicle 150 to continue flying (and avoid crashing) during time period 725. Additionally, an optional wind drag element 510, described above in conjunction with FIGS. 5B-5D, may be used to help stabilize the robotic vehicle(s) 150 and reduce the rate of falling.

Accordingly, repeated application of the technique shown in FIG. 7B combined with horizontal movement may cause the robotic vehicle 150 to "hop" along a parabolic elliptic (e.g., sinusoidal) flight path, as shown in FIG. 7C, which illustrates the height (h) of the robotic vehicle 150 as a function of distance (x). Specifically, during time period 730, power is applied to the engine(s) 420 to cause the robotic vehicle 150 to ascend quickly. The power supplied to the engine(s) 420 is then reduced, causing the robotic vehicle 150 to continue to ascend (e.g., due to the upward momentum of the robotic vehicle 150) and enabling one or more sound measurements to be acquired before the power must be reapplied to the engine(s) 420 during time period 734. The process then repeats when power to the engine(s) 420 is reduced during time period 736. Further, the "hops" performed by the robotic vehicle 150 can be relatively small and almost unperceivable when the power to the engine(s) 420 is reduced for brief periods of time.

Other techniques for reducing the effect of propulsion noise may be implemented as well. For example, and without limitation, when the robotic vehicle 150 includes a UAV, variable pitch propellers may be used to in order to generate negative thrust and, thus, reduce noise associated with the propulsion systems. Additionally, belt driven engines (e.g., belt driven UAV rotors) may be implemented to reduce gear noise due to friction, etc.

In order to ensure the safety of the audience when the robotic vehicle 150 is flying above the audience during acquisition of sound measurements, one or more safety techniques may be implemented. In one technique, a thin cable with a high tensile strength may be attached to the robotic device 150 and anchored to the ceiling or a structure above the audience to prevent the robotic vehicle 150 from falling onto the audience in case of a malfunction. In addition, the cable may also provide a power supply to the robotic vehicle 150, allowing the robotic vehicle 150 to acquire sound measurements without needing to repeatedly land and recharge. The cable may further provide wired communications to the robotic vehicle 150.

In another safety technique, a parachute may be deployed from the robotic vehicle 150 in case of a malfunction, such as a sudden drop in altitude of the robotic vehicle 150. In some embodiments, the parachute may be deployed based on the status of a propulsion system included in the robotic vehicle 150 and/or based on a sensor that detects rapid altitude changes or free fall of the robotic vehicle 150. The parachute may be deployed using a ballistic mechanism, such as a spring or $CO_2$ canister in order to increase speed of deployment.

In yet another safety technique, an inflatable airbag may be included in the robotic vehicle 150 and may be deployed to provide a softer impact when a malfunction of the robotic vehicle 150, such as a sudden drop in altitude is detected, for example, and without limitation, based on the status of the propulsion system and/or the sensor described above. Any of the above techniques also may be combined to further improve audience safety.

Figure 8:
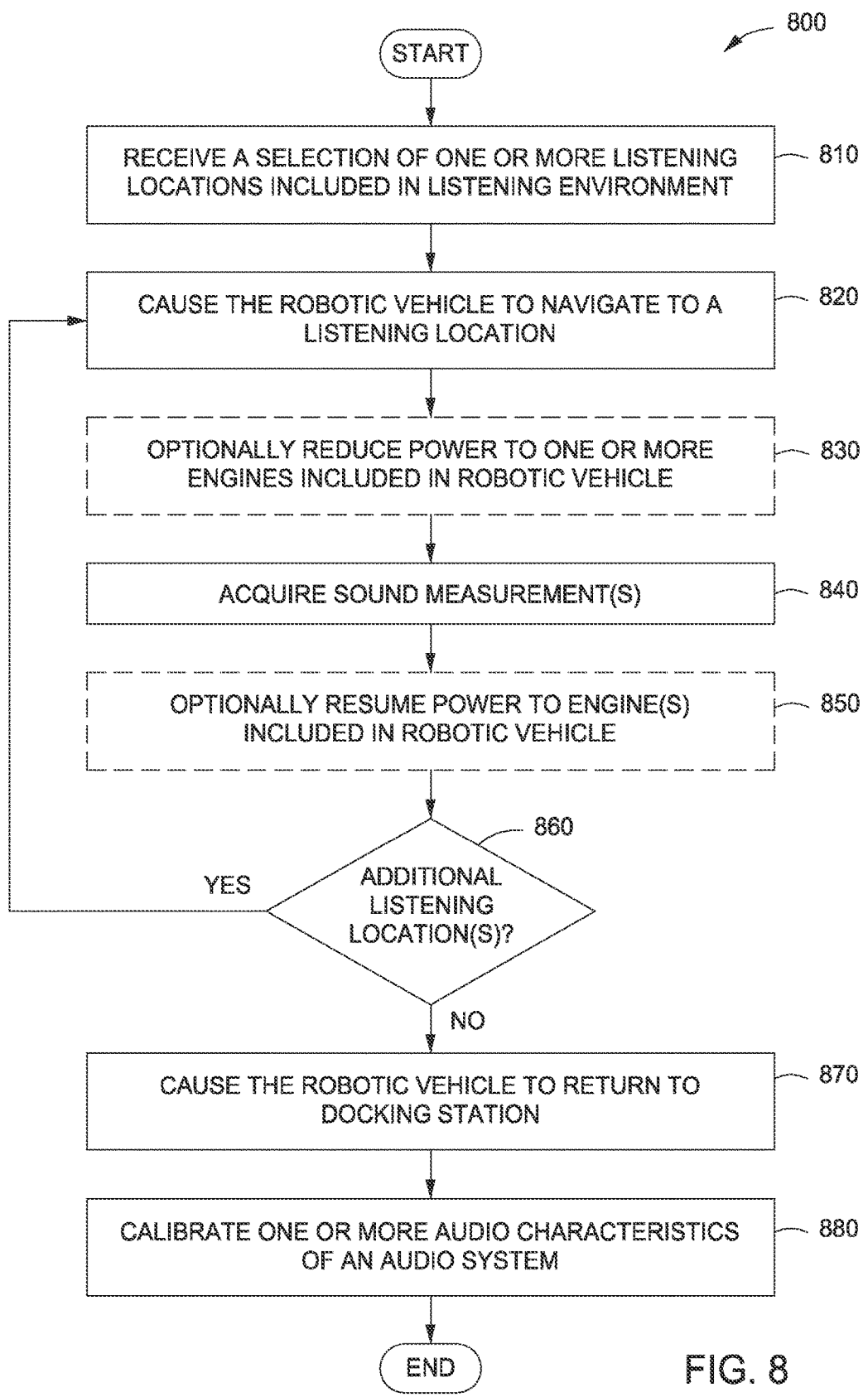
FIG. 8 is a flow diagram of method steps for calibrating an audio system, according to various embodiments.

FIG. 8 is a flow diagram of method steps for calibrating an audio system, according to various embodiments. Although the method steps are described in conjunction with the systems of FIGS. 1-7C, persons skilled in the art will understand that any system configured to perform the method steps, in any order, falls within the scope of the present invention.

As shown, a method 800 begins at step 810, where an application 122 executing on the processing unit 112 receives a selection of one or more listening locations 220 included within a listening environment 205 at which sound measurements are to be acquired. At step 820, the application 122 causes the robotic vehicle 150 to navigate to a first listening location 220 included in the one or more listening locations 220. In some embodiments, the application 122 causes the robotic vehicle 150 to navigate to each listening location 220 by transmitting coordinates associated with the listening location 220 to the application 162 executing on the processing unit 152 of the robotic vehicle 150. The application 162 then causes the robotic vehicle 150 to navigate to the listening location 220 specified by the coordinates. In other embodiments, the application 122 causes the robotic vehicle 150 to navigate to each listening location 220 by transmitting control signals to the robotic vehicle 150 (e.g., via I/O devices 114 and I/O devices 154) to more explicitly control the direction, speed, and/or orientation of the robotic vehicle 150 and/or microphone(s) 156.

Next, at step 830, once the robotic vehicle 150 reaches the listening location 220, the application 122 optionally causes the robotic vehicle 150 to reduce power being supplied to one or more engines 420. At step 840, the application 122 causes one or more sound measurements to be acquired by the robotic vehicle 150 via the microphone(s) 156. Then, at step 850, the application 122 optionally causes power supplied to the one or more engines 420 to be increased.

At step 860, the application 122 determines whether sound measurements are to be acquired at one or more additional listening locations 220. If a sound measurement is to be acquired at an additional listening location 220, then the method 800 returns to step 810. If no additional sound measurements are to be acquired, then the method 800 proceeds to step 870, where the application 122 causes the robotic vehicle 150 to return to the docking station from which it originated. Then, at step 880, the application 122 performs one or more operations to calibrate one or more audio characteristics (e.g., sound pressure levels, frequency characteristics, phase, and the like) of the audio system 200. The method 800 then ends.

Although steps 810 through 870 are described above as being performed by the application 122 executing on processing unit 112 of the control system 102, in some embodiments, some or all of the steps may instead be performed by the application 162 executing on the processing unit 152 of the robotic device 150. For example, in some embodiments, the application 162 may receive simple instructions and/or data (e.g., listening locations 220) from the application 122. The application 162 may then process the simple instructions and/or data (e.g., based on certain characteristics specific to the robotic vehicle 150) to generate more advanced instructions and/or data (e.g., explicit navigation instructions and/or engine control signals) that cause some or all of steps 810 through 870 to be performed. Accordingly, some or all of the steps of the method 800 described above may be performed by one or both of application 122 and application 162.

In sum, the calibration system includes a control system that causes a robotic vehicle to navigate to a listening location, acquire a sound measurement at the listening location, and automatically proceed to the next listening location to acquire the next sound measurement. The control system then calibrates one or more sound characteristics of an audio system based on the sound measurements acquired by the robotic vehicle. Additionally, the robotic vehicle may implement various types of microphone configurations, noise cancellation algorithms, perching/landing techniques, and/or flight paths in order to reduce the impact of propulsion noise on the sound measurements.

At least one advantage of the techniques described herein is that sound measurements can be acquired from a variety listening locations in a more efficient manner, without requiring a user to manually move a microphone within the listening environment. Additionally, embodiments that implement a UAV to acquire sound measurements enable calibration to be more easily performed when a listening environment is densely populated (e.g., during a live performance), since the UAV can navigate above the audience. Furthermore, the disclosed techniques allow the effects of propulsion noise (e.g., produced by a UAV in which a calibration microphone is disposed) to be reduced.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of robotic vehicles and sampling techniques for acquiring and processing sound measurements associated with a listening environment, persons skilled in the art will appreciate that the systems and techniques described herein are applicable to other types of robotic vehicles, sampling techniques, and listening environments. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. A method for calibrating an audio system, the method comprising:
   transmitting information to an aerial robotic vehicle for positioning a microphone at a plurality of different listening locations within a listening environment, wherein the aerial robotic vehicle includes one or more propulsion pods for flying to the plurality of different listening locations; and,
   for each of the different listening locations, acquiring a sound measurement via the microphone while causing a reduction in power supplied to at least one of the one or more propulsion pods to cause the aerial robotic vehicle to travel along a parabolic elliptic flight path;

receiving, from the aerial robotic vehicle through a wireless connection, the sound measurements acquired at the different locations; and calibrating at least one audio characteristic of the audio system based on the sound measurements acquired at the different listening locations.

2. The method of claim 1, wherein the information comprises, for each different listening location, a specific location defined by at least three coordinates.

3. The method of claim 1, further comprising causing a continuous sound measurement to be acquired via the microphone while causing the aerial robotic vehicle to navigate between at least two different listening locations included in the plurality of different listening locations.

4. The method of claim 3, further comprising processing the continuous sound measurement based on a speed of the aerial robotic vehicle and a direction of travel of the aerial robotic vehicle to generate a processed sound measurement, wherein the at least one characteristic of the audio system is calibrated based on the processed sound measurement.

5. The method of claim 1, further comprising causing the microphone to be moved away from at least one of the one or more propulsion pods of the aerial robotic vehicle by a first distance prior to acquiring at least one of the sound measurements.

6. The method of claim 1, further comprising processing at least one of the sound measurements to cancel propulsion noise of the aerial robotic vehicle to generate a processed sound measurement, wherein the at least one characteristic of the audio system is calibrated based on the processed sound measurement.

7. The method of claim 1, further comprising causing at least one additional aerial robotic vehicle to fly in formation with the aerial robotic vehicle while the aerial robotic vehicle is positioning the microphone at the plurality of different listening locations, wherein at least one of the sound measurements is acquired while the microphone is suspended between the aerial robotic vehicle and the at least one additional aerial robotic vehicle.

8. The method of claim 1, wherein the information is wirelessly transmitted to the aerial robotic vehicle.

9. A system for calibrating an audio system, the system comprising:

a memory; and a processor coupled to the memory and configured to:
transmit information to an aerial vehicle for positioning a microphone at a plurality of different listening locations within a listening environment, wherein the aerial vehicle includes one or more propulsion pods for flying to the plurality of different listening locations, for each of the different listening locations, acquire a sound measurement via the microphone while causing a reduction in power supplied to at least one of the one or more propulsion pods to cause the aerial robotic vehicle to travel along a parabolic elliptic flight path, and calibrate at least one audio characteristic of the audio system based on the sound measurements acquired at the different listening locations.

10. The system of claim 9, wherein the processor is further configured to cause the aerial vehicle to at least one of attach to a wall, attach to a ceiling, and perch on a ledge, wherein at least one of the sound measurements is acquired while the aerial vehicle is attached to the wall, attached to the ceiling, or perched on the ledge.

11. The system of claim 9, further comprising the aerial vehicle, wherein the aerial vehicle comprises a motor configured to move the microphone away from at least one of the one or more propulsion pods by a first distance, wherein the processor is configured to cause at least one of the sound measurements to be acquired while the microphone is the first distance away from the at least one of the one or more propulsion pods.

12. The system of claim 9, further comprising the aerial vehicle, wherein the aerial vehicle comprises a plurality of microphones configured to acquire each of the sound measurements, and the processor is further configured to analyze propulsion noise acquired by each of the microphones and process at least one sound measurement based on the propulsion noise to generate a processed sound measurement.

13. The system of claim 9, further comprising the aerial vehicle, wherein the aerial vehicle comprises a motor configured to change the position of the microphone relative to a body of the aerial vehicle.

14. The system of claim 13, wherein at least one listening location included in the plurality of different listening locations is further defined by at least one orientation component, and the processor is further configured to cause the motor to change the position of the microphone relative to the body of the aerial vehicle based on the at least one orientation component.

15. The system of claim 9, wherein the processor is further configured to cause the reduction in power supplied to at least one of the one or more propulsion pods included in the aerial vehicle while the aerial vehicle is ascending.

16. The system of claim 9, further comprising the aerial vehicle, wherein the aerial vehicle comprises an ejection device configured to eject the microphone above the aerial vehicle and catch the microphone, wherein at least one of the sound measurements is acquired while the microphone is above the aerial vehicle.

17. The system of claim 9, further comprising the aerial vehicle, wherein the aerial vehicle comprises at least one of a tether configured to couple the aerial vehicle to a ceiling structure and a wind drag mechanism configured to be deployed during the reduction in power supplied to at least one of the one or more propulsion pods.

18. A non-transitory computer-readable storage medium including instructions that, when executed by a processor, cause the processor to acquire sound measurements, by performing the step of:

transmitting information to an aerial vehicle for positioning a microphone at a plurality of different listening locations within a listening environment, wherein the aerial vehicle includes one or more propulsion pods for flying to the plurality of different listening locations;

for each of the different listening locations, acquiring a sound measurement via the microphone while causing a reduction in power supplied to at least one of the one or more propulsion pods to cause the aerial robotic vehicle to travel along a parabolic elliptic flight path; and calibrating at least one audio characteristic of the audio system based on the sound measurements acquired at the different listening locations.

19. The non-transitory computer-readable storage medium of claim 18, wherein the information comprises, for each different listening location, a specific location defined by at least three coordinates.

* * * * *